United States Patent

Dodson et al.

[11] Patent Number: 5,841,426
[45] Date of Patent: Nov. 24, 1998

[54] FOOT OPERATED COMPUTER MOUSE

[76] Inventors: Dean Dodson, 2337 Hilo Ave. N., Oakdale, Minn. 55128; Timothy Kelley, 11204 Dellwood Rd., Stillwater, Minn. 55082

[21] Appl. No.: 751,394

[22] Filed: Nov. 18, 1996

[51] Int. Cl.$^6$ .................................................. G09G 5/08
[52] U.S. Cl. ..................... 345/163; 273/148 B; 341/21; 345/157; 400/273
[58] Field of Search ................... 345/167, 145, 345/157, 160, 163, 159, 156; 273/148 B; 74/478; 400/273; 341/20, 21; 200/86.5

[56] References Cited

U.S. PATENT DOCUMENTS

| | | | |
|---|---|---|---|
| 5,148,152 | 9/1992 | Stueckle et al. | |
| 5,334,997 | 8/1994 | Scallon | 345/167 |
| 5,689,253 | 11/1997 | Hargreaves et al. | 341/22 |
| 5,694,152 | 12/1997 | Loop | 345/159 |
| 5,745,055 | 4/1998 | Redlich et al. | 341/20 |

FOREIGN PATENT DOCUMENTS

| | | | |
|---|---|---|---|
| 2692386 | 12/1993 | France | 345/163 |
| 9311526 | 6/1993 | WIPO | 345/163 |

OTHER PUBLICATIONS

IBM Technical Disclosure Bulletin, vol. 28, No. 11, Apr. 1986 "Foot Operated Mouse".

*Primary Examiner*—Brent A. Swarthout
*Attorney, Agent, or Firm*—Terrance L. Siemens

[57] ABSTRACT

A foot operated mouse for controlling a computer, providing similar functions as a conventional hand operated mouse. The novel foot operated mouse has a base which rests on a horizontal pad or surface, and a separate platform for supporting the foot. A ball for generating positional signals based upon an x-and-y coordinate grid is fixed to the base. The foot platform is attached to the ball and can wobble, or simultaneously rotate and incline, thereon. Switch operators corresponding to conventional finger operated control buttons of a conventional hand operated mouse are provided. Preferably, these switch operators are hinged to the foot platform, and incline when depressed. In an alternative embodiment, the foot platform and switch operators are integral. In the latter embodiment, switch operation results from contact of the platform with the base. Preferably, the upper surface of the platform is inclined, thereby establishing a toe position and a heel position. In an alternative embodiment, one switch operator is located at the toe position and another at the heel position.

3 Claims, 2 Drawing Sheets

FOOT OPERATED COMPUTER MOUSE

BACKGROUND OF THE INVENTION

1. FIELD OF THE INVENTION

The present invention relates to computer peripheral hardware or devices, and more particular to a controller particularly suited for operation by foot. Still more particularly, the invention relates to a "mouse" employing an x-and-y coordinate grid in conventional fashion. The mouse is constructed to have a platform supporting the foot which partially encloses a conventional roller, and which platform wobbles to enable peripheral edges of the platform to contact the base of the device. This contact replaces conventional finger operated buttons.

2. DESCRIPTION OF THE PRIOR ART

Computers employed for such tasks as word processing typically have both keyboards and control devices requiring manual grasping and manipulation. This arrangement leads to the frequent requirement that one hand be removed from the keypad to operate the manual control device or mouse. This style of operation is somewhat inefficient since the hand operating the mouse must be replaced on the keypad prior to resuming full operation of the keypad. Also, most computer furniture is not designed to accommodate a mouse in close proximity to the keypad. Close proximity would mitigate, but still not entirely solve, the problem.

The prior art has addressed this problem by suggesting foot operated controls which could replace the mouse. The user's hands are thus freed to operate the keypad, while traditional mouse functions are performed by foot.

One example of a prior art foot operated control is seen in U.S. Pat. No. 5,148,152, issued to Duane H. Stueckle et al. on Sep. 15, 1992. The subject control has two foot pedals independently hinged to the base of the control. Each pedal is upwardly spring biased. A chain or cable spans the two pedals. Depression of one pedal pulls the chain in one direction. Chain motion rotates a potentiometer to generate control signals. By contrast, the present invention provides the usual rolling ball and x-and-y coordinate type of control, while having contact switches operated in similar manner to traditional mouse buttons.

Another prior art foot control is seen in U.S. Pat. No. 5,334,997, issued to David Scallon on Aug. 2, 1994. Scallon's device provides two separated, upwardly open foot chambers. Each chamber has a centrally located rolling ball which is directly contacted by the user's foot. Short upright walls surrounding the rolling ball are provided with switches having operating buttons on inwardly facing vertical surfaces. These switches are analogous to traditional buttons of a mouse, and are operated by moving the foot forwardly or laterally to make contact. By contrast, the present invention has a platform covering the rolling ball, so that forward and lateral motion move the ball but do not operate buttons. The platform of the present invention has independently inclinable sections which are depressed to operate switches which are the equivalent to buttons of a mouse. Whereas Scallon's device requires extremely accurate foot motions due to direct contact with the ball, the platform of the present invention accommodates limited rocking of the foot without effecting a control command. Also, while a user of Scallon's device must lift the foot above the ball to operate the buttons, this is not required in the present invention. Consequently, the present invention is much easier to use without generating spurious command signals.

Neither of the above inventions and patents, taken either singly or in combination, is seen to describe the instant invention as claimed.

SUMMARY OF THE INVENTION

The present invention provides a mouse type of control for computers which is adapted to operate by foot. The control includes a base which glides horizontally over a pad or flat surface, and a platform which is supported just above the base while enabling wobbling motion relative to the base. When the entire control is moved over the pad or flat surface, conventional x-and-y coordinate based signals are conducted to the computer by a communications cable. When the platform is inclined sufficiently to make contact with the base, command signals corresponding to those of mouse buttons are generated.

The structure of the present invention varies from that of a conventional hand operated mouse in both dimensions and in configuration of the foot platform. The foot platform is inclined with the base remaining horizontal such that the toes are elevated relative to the heel. In alternative embodiments, the base wobbles, or inclines universally on the base, or is fixed in relation to the base. In the latter embodiment, hinged switch operators comparable to mouse buttons incline relative to the foot platform when depressed.

The novel arrangement provides more practical control of the foot operated mouse than is possible with other designs. Because the ball is covered by the foot platform, inclining of the sole of the foot will not roll the ball. In particular, minor, involuntary motions of the foot do not automatically generate unintended command signals. The switch operators comparable to buttons of a conventional mouse may be operated with normal weight of the foot resting on the foot platform. It should be noted that careless or involuntary horizontal motions of the foot will not inadvertently contact a button type switch.

Also, the present design more closely follows conventional arrangement of switches. This is true for both the rolling ball and for switches which are counterparts to button switches. Therefore, adaptation to the present invention by those familiar with traditional hand wielded computer mice comes more naturally.

In different embodiments, switch operators comparable to buttons are hinged to the foot platform, and are operated by inclining them. The foot platform remains in a constant position. These inclinable switch operators may be located at right and left sides of the platform at the top or toe area, or may be provided at the heel and at the toe.

Although it is preferred that the ball employ conventional technology utilizing the x-and-y coordinate system, it is contemplated that the invention may be adapted to utilize polar coordinates.

Accordingly, it is a principal object of the invention to provide a foot operated control device for controlling computers.

It is another object of the invention that minor or involuntary foot motions not be likely to generate unintended command signals.

It is a further object of the invention to retain conventional rolling ball, x-and-y coordinate controls.

Still another object of the invention is to provide counterparts to computer buttons operated by depressing a switch operator.

An additional object of the invention is to incline the upper surface of the invention in order to accommodate the foot in ergonomical fashion.

It is again an object of the invention to provide switch operators at heel and toe areas of the foot operated mouse.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
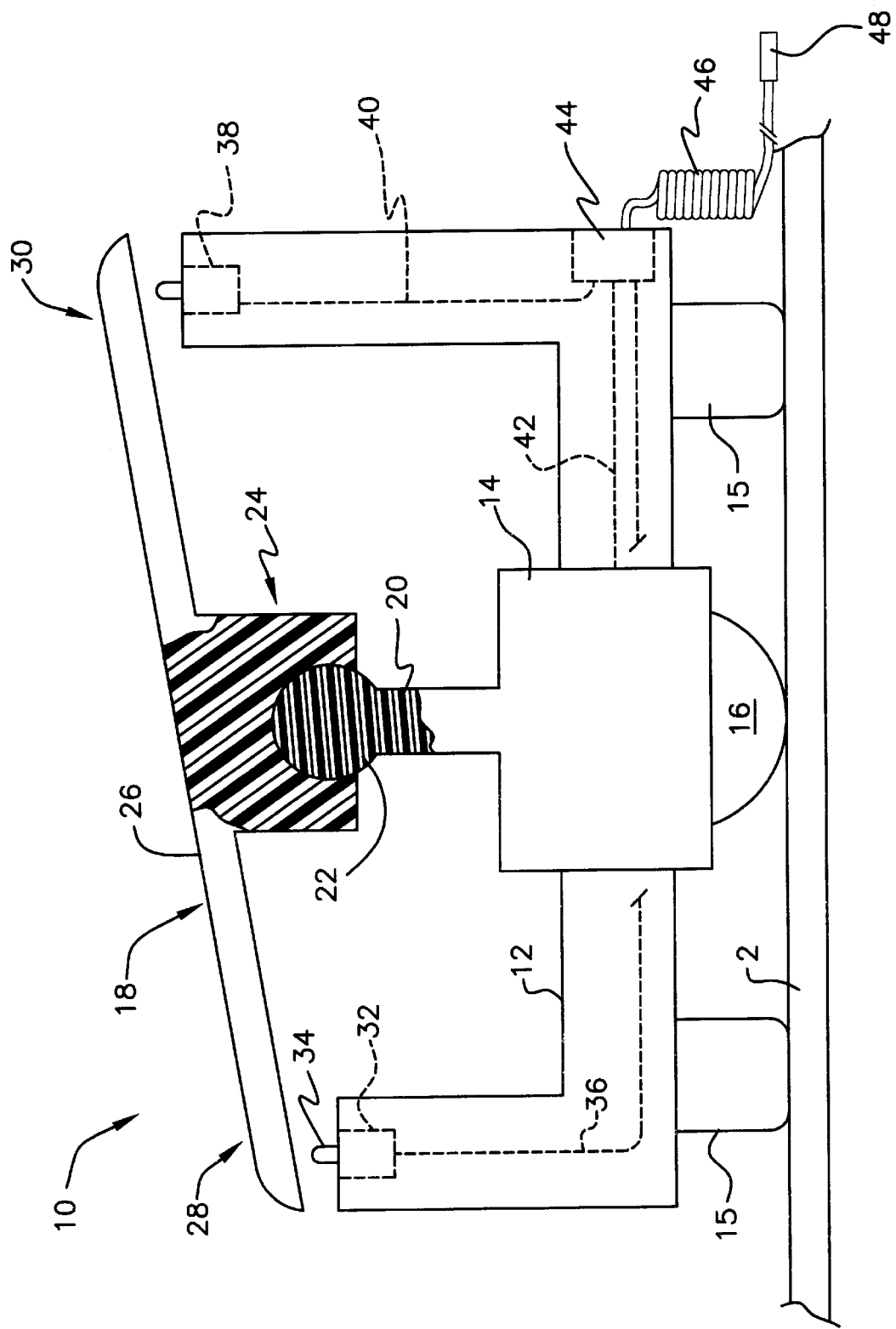
FIG. 1 is a diagrammatic, side elevational view of a first embodiment of the invention, shown partly in cross section.

Turning now to FIG. 1 of the drawings, a first embodiment of the novel foot operated controller for generating command signals for operating a computer is generally indicated at 10. Controller 10 has a base 12 to which is anchored a ball signal generator 14. Base 12 supports controller 10 in an upright position when placed on a surface 2 or other horizontal surface for enabling operation of ball signal generator 14. Base 12 optionally has legs 15 for steadying controller 10 on surface 2.

Ball signal generator 14 includes internal components (not specifically shown) typically associated with a computer cursor control for generating x-and-y coordinate positional signals. These components are well known, and need not be set forth in greater detail. However, it will be noted that ball 16 projects downwardly from ball signal generator 14 in order to make contact with surface 2.

Controller 10 has a platform 18 for supporting the foot of the user. Unlike a typical hand wielded computer mouse, platform 18 has structure for wobbling, or simultaneously rotating and inclining, relative to base 12. In the embodiment depicted, a column 20 terminating in the ball 22 of a ball and socket joint projects upwardly from ball signal generator 14. Ball 22 is received in socket 24 of the ball and socket joint. Socket 24 is fixed to platform 18. Optionally, the ball and socket joint may be provided with a spring (not shown) for urging base 18 into a predetermined position relative to base 12. Alternatively, position of platform 18 may be determined by frictional engagement of ball 22. In the latter case, the ball and socket joint will be designed to incorporate appropriate frictional characteristics.

Platform 18 is arranged to have a top surface 26 which is inclined when base 12 is supported on a horizontal surface. Inclination determines a heel position on surface 26 at 28 and a toe position at 30. Inclination affords a comfortable position of the user's foot when placed on platform 18.

Novel controller 10 departs from conventional construction of a computer mouse in a way other than having an upper member which is rotatable and inclinable relative to the bottom surface. That is, switch operators for operating switches comparable to buttons conventionally located on the top surface of a conventional computer mouse are relocated to cooperate with foot operation.

In the embodiment of FIG. 1, a first execution switch 32 for generating execution signals is located at or below heel position 28. When platform 18 is inclined downwardly at position 28, it will contact a plunger 34 of switch 32. A signal is then conducted through signal conductor 36. A second execution switch 38, generally similar in construction and performance to switch 32, is located at or below position 30, and generates execution signals which are conducted through signal conductor 40.

Ball signal generator 14 generates positional signals conducted by signal conductor 42. Signal conductors 36, 40, 42 are joined at a terminal 44 of the proximal end of a flexible communication cable 46. Cable 46 has at its distal end a plug terminal 48 configured for attachment to a selected standard port of the computer (not shown) being controlled by controller 10. Communication connection ports of computers are provided according to industry standards. Terminal 48 may have a configuration corresponding to any selected one of these well known connection ports.

In the embodiment of FIG. 1, execution switches 32 and 38 have operators integral with platform 18. A switch operator is a movable part of the switch which is contacted by the user of the device. When platform 18 is inclined forwardly or backwardly, it will contact a plunger of a switch 32 or 38. Platform 18 itself, then, serves as the switch operator.

It is desired to have an inclined switch operator, that being an operator which must be moved by variably inclining the operator. This arrangement affords easy operation of the switch by foot and also allows the switch operator to be flush with the upper surface 26 of platform 18 when not being operated. Also, the heel and toe of the user's foot need not be lifted above surface 26 in order to reach the top of a linear action operator (not shown), such as a button which projects upwardly from surface 26.

Finally, unlike a capacitance or similar operator, actual motion or displacement of the switch operator to operate the associated switch contacts is desirable in a foot operated switch because switch operation is thus readily discernible and predictable.

Figure 2:
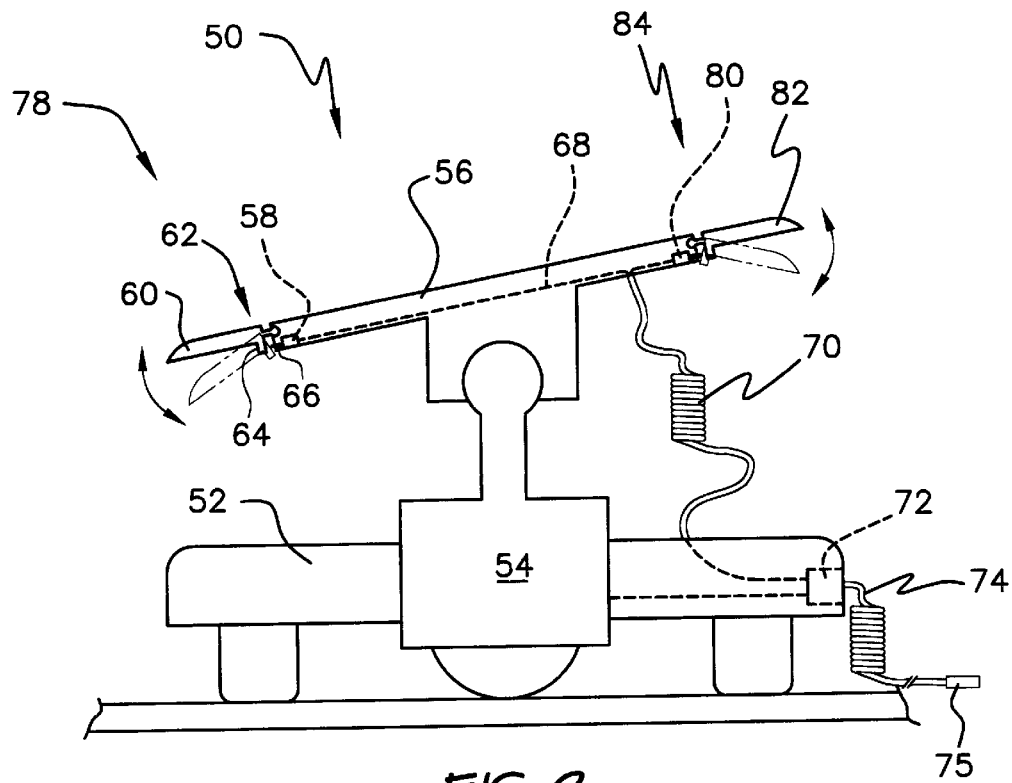
FIG. 2 is a diagrammatic, side elevational view of a second embodiment of the invention, shown partly in cross section.

A second arrangement of execution switches is shown in FIG. 2. Controller 50 has a base 52 and a ball signal generator 54 which operate similarly to the embodiment of FIG. 1. Platform 56 is anchored to base 52 by a ball and socket arrangement similar to that of FIG. 1. However, in the embodiment of FIG. 2, execution switch 58 is fixed to platform 56. Switch operator 60 is pivotally connected to platform 56 by a hinge 62, and has a projecting surface or finger 64. When switch operator 60 is inclined by foot to occupy the position shown in broken lines, finger 64 depresses plunger 66 of switch 58. An execution signal is then conducted by conductor 68 and a flexible cable 70 to terminal 72 of communications cable 74. Cable 74 has a terminal 76 which, similarly to terminal 48 of the embodiment of FIG. 1, is compatible with the communication port of the computer being controlled. Switch 58 and its operator 60 are located at the heel position 78 of platform 56. A similar execution switch 80 and associated operator 82 are provided at toe position 84 of platform 56. Thus, in the embodiment of FIG. 2, the entire execution switches 58 and 80 are mounted on platform 56. In the embodiment of FIG. 2, switch operators 60 and 82 are inclined operators, but are pivotally connected to platform 56 rather than being integral therewith in the manner of the embodiment of FIG. 1.

Figure 3:
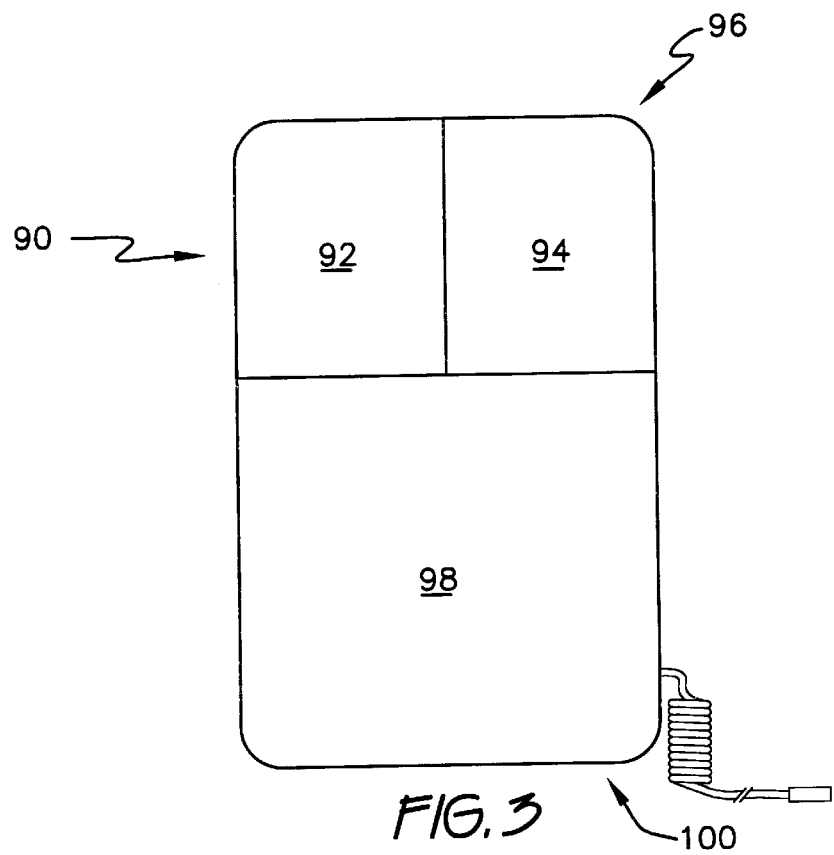
FIG. 3 is a top plan view of a third embodiment of the invention, drawn to reduced scale.

In a variation of the embodiment of FIG. 2, as shown in FIG. 3, controller 90 has switch operators 92, 94 both disposed at the toe position 96 of platform 98. Controller 90 is in other respects similar to controller 50 of FIG. 2. The embodiment of FIG. 3 is an optional arrangement for those who prefer to operate execution switches only from the toe position.

The present invention is susceptible to variations and modifications which may occur to those of skill in the art. For example, terminal 44 may comprise a socket for receiving a communications cable, rather than incorporating cable 46 as an integral part of controller 10. Also, the embodiment of FIG. 3 may be modified to locate both execution switch operators 92, 94 at the heel position 100 of platform 98. Similarly, it would be possible to relocate a switch 32 or 38 of the embodiment of FIG. 1 so as to have both switches 32 and 38 selectively at the heel or toe position 28 or 30 of platform 18.

It is to be understood that the present invention is not limited to the embodiments described above, but encompasses any and all embodiments within the scope of the following claims.

We claim:

1. A foot operated controller that rests on a floor for generating computer command signals to a computer comprising:

a base having a top side and a bottom side, a ball signal generator attached to said bottom side of said base for generating position signals, said ball signal generator including a ball depending from said bottom side of said base, so that said ball contacts the floor;

a platform located on said top side of said base, said platform adapted to cooperate with and support a user's foot, said platform engaged with a pivot means for pivotal movement with respect to said base;

support legs depending from said bottom side of said base, said support legs being disposed about said ball, where said support legs are in contact with the floor such that said base is held in a generally parallel relationship with the floor and that said ball is also held in contact with the floor and is universally rotatable within said base; and switch means disposed on said platform for generating an execution signal when said platform pivots through a limited range about said pivot means in at least a first direction; whereby said controller is placed on the floor and the user's foot may be used to both generate said position signals to a computer by movement of said platform and said base, along with said depending ball, on the floor, and to generate execution signals by activation, also by the user's foot, of said switch means on said platform, thus allowing the user to operate mouse driven menus on the computer by means of one or another of their feet.

2. The foot operated controller according to claim 1, wherein said platform is disposed at an angle to said base, to support the natural inclination of a user's foot.

3. The foot operated controller according to claim 1, wherein said platform can pivot through a limited range in relation to said base, and where said switch means comprises two switches, a first switch activating when said platform is pivoted in a first direction to the limit of the range and a second switch activating when said platform is pivoted in a second direction to the limit of the range.

* * * * *